United States Patent
Bugg et al.

(10) Patent No.: US 6,635,202 B1
(45) Date of Patent: Oct. 21, 2003

(54) METHOD FOR FILLING AND REINFORCING HONEYCOMB SANDWICH PANELS

(75) Inventors: Dean Anthony Bugg, Cambridge (GB); Barrie James Hayes, Little Eversden (GB)

(73) Assignee: Vantico Inc., Brewster, NY (US)

( * ) Notice: Subject to any disclaimer, the term of this patent is extended or adjusted under 35 U.S.C. 154(b) by 0 days.

(21) Appl. No.: 09/418,609

(22) Filed: Oct. 15, 1999

(30) Foreign Application Priority Data

Oct. 23, 1998 (GB) .............................................. 9823139
May 7, 1999 (GB) .............................................. 9910481

(51) Int. Cl.⁷ ..................... B29C 44/12; B29C 44/18; B29D 24/00
(52) U.S. Cl. ..................... 264/45.1; 52/576; 52/745.19; 156/79; 264/46.5; 428/318.4
(58) Field of Search ............................... 264/45.1, 46.4, 264/46.5, 46.6, 46.7, 321, 45.4; 52/576, 745.19; 428/304.4, 318.4; 156/79

(56) References Cited

U.S. PATENT DOCUMENTS

| | | | |
|---|---|---|---|
| 3,673,186 A | * 6/1972 | Cyba | |
| 4,092,296 A | * 5/1978 | Skiff | |
| 4,273,737 A | * 6/1981 | Grachten | 264/46.5 |
| 4,307,457 A | * 12/1981 | Wills | |
| 4,425,441 A | 1/1984 | Gagliani et al. | 521/56 |
| 4,486,994 A | * 12/1984 | Fisher et al. | 264/46.5 |
| 4,734,231 A | 3/1988 | Morita et al. | 264/45.3 |
| 4,806,573 A | 2/1989 | Lee | 521/157 |
| 4,964,936 A | * 10/1990 | Ferro | 264/321 |
| 5,188,879 A | * 2/1993 | Hill et al. | 264/321 |
| 5,338,594 A | * 8/1994 | Wang et al. | 264/46.6 |

FOREIGN PATENT DOCUMENTS

| | | |
|---|---|---|
| EP | 0514623 | 11/1992 |
| GB | 1 136 076 | * 12/1968 |
| JP | 55-123436 | * 9/1980 |
| WO | 88/02011 | 3/1988 |

OTHER PUBLICATIONS

Derwent Abstr. 85–173628 for JP 60101031.

* cited by examiner

Primary Examiner—Mathieu D. Vargot
(74) Attorney, Agent, or Firm—Proskauer Rose LLP

(57) ABSTRACT

The present invention relates to a process for the fast and efficient filling of voids of both simple and complex shape which can be carried out at room temperature. In particular, the present invention consists of the use of free flowing thermally expanding and curing powders which are poured into the voids and then heated causing the powder to expand, coalesce and cure and thus filling or partially filling the void space as required. The process according to the present invention is particularly suitable for filling the spaces in, around and between honeycomb or pre-formed foam cores as required to produce a filled or partially filled honeycomb or foam core or any other material used in sandwich panel construction. This process is also a simple and efficient method for filling moulds suitable for use in cellular artefact production. The filled or partially filled mould or honeycomb core can then be cured to produce bonded sandwich panels or moulded cellular artefacts. In sandwich panel construction the core material can be bounded by one or more surface skins and the cured bonded panel can be cut to provide a panel having pre-sealed edges.

13 Claims, 2 Drawing Sheets

METHOD FOR FILLING AND REINFORCING HONEYCOMB SANDWICH PANELS

TECHNICAL FIELD

The present invention relates to a process for the fast and efficient filling of voids of both simple and complex shape which can be carried out at room temperature. In particular, the present invention consists of the use of free flowing thermally expanding and curing powders which are poured into the voids and then heated causing the powder to expand, coalesce and cure and thus filling or partially filling the void space as required. The process according to the present invention is particularly suitable for filling the spaces in, around and between honeycomb or pre-formed foam cores as required to produce a filled or partially filled honeycomb or foam core or any other material used in sandwich panel construction. This process is also a simple and efficient method for filling moulds suitable for use in cellular artefact production. The filled or partially filled mould or honeycomb core can then be cured to produce bonded sandwich panels or moulded cellular artefacts. In sandwich panel construction the core material can be bounded by one or more surface skins and the cured bonded panel can be cut to provide a panel having pre-sealed edges.

BACKGROUND

Sandwich panels, that is panels produced with rigid faces and lower density material bonded between them have been used in many applications and in high performance versions for around 50 years. The technical advantages of such panels are many but in particular they are structures offering high specific stiffness and modulus, that is, the flexural strength and modulus divided by the density of the panel is greater than that obtainable by the component materials individually. Typical examples of such panels are: a plastic rigid foam bonded between aluminium or glass reinforced plastic faces (skins) for the manufacture of truck bodies; paper honeycomb bonded between wooden skins in the construction of doors; and, in particular, aluminium honeycomb bonded between metal or carbon fibre/resin skins as typically used in the aerospace industry.

In general, high performance panels have the central lower density material (core) bonded to the skins with a thermoset (non melting) adhesive and often employ elevated temperature curing to achieve the highest bonding performance. In the construction of such panels it is often important that the edges of the panels are made solid and smooth by some means to ease joining to other surfaces or further panels or for cosmetic purposes. Other advantages of smooth edges are: safer handling; prevention of accidental damage; and to avoid the ingress of water, dirt and other contaminants which might be detrimental to the performance or external characteristics of the panel. This may be achieved by either assembling the panel before bonding with a solid edge material, such as wood for door panels, or subsequent to bonding, with low density pastes as is usually the case with aerospace honeycomb panels.

Frequently, in panel construction, the core material is not available in a large enough size to make a complete panel or different core materials need to be used within the same panel. In such cases it is often necessary, for structural performance reasons, to join the various core pieces together either before, or during, the bonding to form the panel. This may be achieved by the use of high strength adhesive pastes or adhesive films or tapes which preferably expand before setting on heating during the panel bonding (curing) cycle.

In high performance panels it may also be a requirement that the core material is attached to any solid edges which may be built into the panel. This internal attachment is usually achieved by the use of high performance adhesive pastes or expanding (foaming) films.

In the use of such panels it is often desirable to attach additional structures to them, many of which could be load bearing. For example the attachment of a coat hook to a door sandwich panel or a bolt socket in an aircraft floor panel. In the case of the coat hook which is usually lightly loaded a hook with a sufficiently large flange area may be sufficient to provide the necessary load bearing strength if bonded on the skin surface. For higher loadings a wood block may be inserted as a load attachment point, preferably before, but possibly, after the panel has been produced. In the case of high potential loadings in critical structures, solid high strength blocks can be built into the panel structure in the correct places during manufacture, or special high strength inserts may be bonded into the panel after production and routing out appropriate size holes in the panel to fit the insert, or alternatively the honeycomb in the panel can be reinforced by a high performance thermosetting adhesive or casting paste in those areas which need to be reinforced regardless of complexity of shape. The latter approach, where strong enough, is the most elegant as very specific areas may be reinforced in a honeycomb panel down to the size of an individual honeycomb cell. Furthermore, such reinforcement maybe carried out either before or during the final curing of the panel to avoid cutting of the skins.

In the case of sandwich panels with a plastic foam core it is usually sufficient to carry out these connection, joining and reinforcement operations by the use of a thermosetting paste which stays in position during the curing cycle. Typically this could be a "thixotropic" two part epoxy resin based paste. If final sealing and finishing of the edges of the sandwich panel are needed then a similar paste or a syntactic paste could be filled into the edges, smoothed and allowed to cure. A syntactic paste is a term widely used in the Aerospace industry to denote a thermosetting resin either one or two part (needing mixing prior to use) which contains pre-formed hollow small spheres made of glass, carbon, silicates or a variety of plastic materials. A common feature of these micro-spheres is their low density, which is also imparted to the paste and is the prime reason for their use. An additional consideration is the relative ease they give to the cured composition for sanding or smoothing.

In the case of sandwich panels using honeycomb core for high performance ground and marine transport and sports goods and particularly those used in aerospace, where strength, light weight and resistance to degradation is extremely important, these syntactic pastes have been used for most of the attachment and reinforcing needs as described hereinbefore for at least the last 30 years. Typical products of this type are REDUX 252 (RTM) a two pack syntactic epoxy paste available from Ciba Specialty Chemicals PLC, and EC 3524 B/A (RTM) available from the 3M Company.

Where foam materials are used as cores, the edges of the foam are irregular due to cutting and the size of the pore or cell structure within the foam. Where honeycomb is used the situation is usually worse, in that cut or uncut honeycomb edges are extremely irregular and therefore difficult to fill accurately and the size of the gaps to be filled can be almost as large as the individual cell, which itself would be typically up to 6 mm, but is often larger still.

Thus, there exists a particularly difficult physical problem in relation to: the accurate and complete filling of gaps in; the adhering of parts to; and the reinforcing of honeycomb panels. Furthermore, since high performance honeycomb panels such as those typically made from aluminium, phenolic resin coated "Nomex"(RTM) paper and other metal or fibre based products, are usually used to obtain high performance at minimum weight it is also highly desirable to make excellent connections to the panel component parts and to other materials, where necessary for structural performance reasons, but at minimum weight. In general in aerospace, high performance ground and marine transport and sports applications which use honeycomb, syntactic pastes have been used as the primary means to achieve reinforcement and connection. For the avoidance of doubt direct bonding between the honeycomb and the skin is generally effected by a film or liquid adhesive.

In order for these syntactic pastes to achieve a minimum density for the required strength in these applications it has been necessary to include significant quantities of the hollow micro-spheres. The lower the density required the more micro-spheres need to be incorporated. Since the micro-spheres by definition are lower in density than the resins and hardeners used in the syntactic pastes, they have a tendency to float to the top of the liquid resin or hardener, thus giving a non-uniform, heterogeneous mixture on standing or storage. To prevent this it is common practice to include additional materials which have the general effect of increasing the viscosity of the mixture thus making the whole system very viscous. Typical materials added to prevent micro-sphere flotation are well known to those skilled in the art and include finely divided silica particles such as those sold by Degussa under the trade name Aerosil (RTM) or by the Cabot Group as Cabosil (RTM).

Typical densities of such cured mixed syntactic pastes range from 0.6 to 0.8 gm/ml. These are viscous materials which may be mixed by hand stirring with some difficulty. Alternatively, the materials may be mixed by forcing them through a static mixer head with external pressure applied to the individual components whether they be prepacked in dispenser cartridges or other larger containers. Where the density decreases below 0.6 gm/ml the viscosity becomes so high that kneading by hand or dough mixer may be required. In the latter case, care must be exercised not to break a proportion of the hollow micro-spheres leading to an undesirable increase in density. This consideration also applies to higher density syntactic pastes where they may be pumped through pipes or tubes or other constrictions.

In order to overcome the difficult mixing operations associated with such viscous pastes, single pack syntactics have been produced. Because these are reactive mixtures, that is the resin and hardener have been premixed together, it is necessary to transport and store them under cold, usually 'deep freeze' (−18° C.) conditions. Even under such cold storage conditions the useable life of the pastes may be severely constrained depending upon the reactivity of the mixture. A further disadvantage of this single pack syntactic approach is the need to allow the mixture to warm to room temperature before removal from its container in order to prevent the condensation of moisture onto the mixture, an effect which is considered highly undesirable as it may have an adverse impact on the wetting properties of the paste, its curing reaction, or even generate excess volatiles during the panel cure cycle. These volatile materials may disturb the position of the paste or even, if excessive, cause damage to the honeycomb core or cause blistering between the core and the skins. An additional disadvantage of the need to warm the paste to room temperature is that those pastes having a high reactivity at room temperature have their usable life decreased. For the latter reason some of the single pack pastes are designed to react quickly only at elevated temperatures, normally the cure temperature used in the panel bonding step. However, whether curing at room temperature or at elevated temperature the single pack pastes, although requiring no mixing by the panel constructor, still suffer from being very viscous tacky materials if the density is in the normal range required for most high performance sandwich panel applications.

Thus the traditional method for filling, fixing, joining, and reinforcing honeycomb to itself and surrounding materials has been the application of these one or two pack syntactic pastes accurately and completely into the complex spaces which exist between the cut honeycomb edges themselves and between them and other surrounding materials and/or filling the honeycomb cells for reinforcement. It is of great importance to fully fill these spaces as failure to do so may create structural weaknesses in the panel and allow the ingress of degredants which ultimately may have the same effect as well as increasing weight.

As may be imagined the task of filling these spaces, many of which may be some centimeter deep, in such a springy and delicate material in the unbonded state of a honeycomb panel, with a very viscous and sticky material is difficulty, messy and time consuming and requires great skill and experience by the operator if it is to be effected properly. It is difficult to maintain a completely uncontaminated environment with such an operation and frequently, a large amount of mixed material is wasted when a particular job is complete or reaction of the mixed material makes it too viscous to use for practical purposes. The operation of filling with these syntactic pastes also results in contaminated equipment, protective clothing, containers and so forth all of which need careful and legal disposal operations. Furthermore, it is impossible practically to avoid all personal contact with these materials in this difficult process whether by touching, breathing or just vapour contact. Whilst in general manufacturers of syntactic pastes attempt to minimise such dangers by careful choice of the materials used in them, the risk of operator sensitivity remains, which is a further disadvantage.

There have been attempts to overcome some of the aforementioned process and technical disadvantages by developing alternative methods to achieve some of the reinforcing and/or joining operations necessary in the manufacture of sandwich and particularly honeycomb sandwich panels.

In one method, resin and hardener components are premixed and the composition is pre-formed into flat sheets (patties) of a suitable thickness for a specific honeycomb panel dimension, covered with a release film on each side and deep frozen. To use the composition the panel manufacturer warms the patty to room temperature, to avoid condensation, removes one release film and presses the patty into the honeycomb panel or vice-versa. While this technique does simplify the application of syntactic materials in sandwich panel reinforcement applications it cannot easily be used for the attachment of honeycomb to itself or to edges and the like. This technique is nevertheless an advantage for reinforcing honeycomb where the honeycomb is the same thickness or a simple multiple of the thickness of the patty. All other disadvantages of frozen premixed material remain with this approach.

In another approach, a pre-formed flexible uniform thickness film of thermosetting, hot curing, foaming, adhesive is utilised. This material must be tailored to size by some cutting technique and placed between the core and other sections of the panel core structure that need to be bonded by the adhesive film. During the thermal curing cycle the film softens, melts, expands and cures. If the film has been correctly tailored and placed the expansion will enable some attachment of the honeycomb and other items such as inserts or edge pieces. These expanding film adhesives cannot be used for reinforcing honeycomb for attachments as they are one of finite thickness, usually around 1.5 mm and would be impossible to position in individual cells or substantial gaps or spaces. Whilst having the advantage over syntactic pastes in general for handling in that they are flexible, non tacky and require no mixing they have strong disadvantages in that cutting to shape and placing in position can be extremely expensive and time consuming and that on expansion and cure they rarely fill all the spaces necessary and hence result in panels having less than the optimum structural strength and rarely fill gaps well enough to avoid the ingress of environmental degradants.

Thus, until now the essential tasks of joining honeycomb, attaching honeycomb to edge pieces and inserts, reinforcing for load bearing attachments and panel edge filling and sealing has been carried out by the skilled use of very viscous adhesives, tacky syntactic pastes or patties or by tailoring of foaming adhesive films as described above.

Thus, it would be a significant technical advantage to develop a method for the production of sandwich panels which are strong, light and durable, and wherein the panel filling operation can be carried out under room temperature conditions; the filling operation has increased efficiency; no mixing is required; the filling operation wastes less filling material; contact hazards are reduced; the filling operation allows for flexibility of filling materials and wherein the components of the final sandwich panels are bonded together in a simple effective manner.

SUMMARY OF THE INVENTION

We have now developed a process which overcomes the problems of the prior art processes. The present invention provides a process for the fast and efficient localised filling of sandwich panels which can be carried out at room temperature. Further our invention provides a method for the production of strong, durable, light-weight sandwich panels which are effectively bonded. The present invention additionally provides a method for the manufacture of sandwich panels having a variety of filling materials as well as providing a simple method for the filling and sealing of the panel edges. Our invention consists of the use of thermally expanding powders which are poured into the spaces in, between and around honeycomb or pre-formed foam cores to produce a filled honeycomb which can then be either cured as is or following the addition of a further skin by heating. As can be readily envisaged, such a pourable dry powder can be easily and quickly placed exactly in position, however complex the shape of space to be filled. Furthermore, such powders can be designed to have long shelf lives at ambient temperatures; require no mixing and; provided they contain no very fine particles, cause no pollution and give no waste. Thus, in addition to the ease of use, the process according to the present invention minimises material contamination of the workplace, tools, wetting and operator contact.

In a further aspect of the process according to the present invention a thermally expanding powder can be poured into a released mould, heated to form a coherent low density cured solid object corresponding to the shape of the mould and then demoulded. The benefits of using the process according to the present invention for the production of release moulded objects include ease of use, process efficiency, reduction of material contamination of the workplace, tools, wetting and operator contact.

BRIEF DESCRIPTION OF THE DRAWINGS

FIG. 1 illustrates the key stages in the process according to the present invention.

DESCRIPTION

Figure 1A:
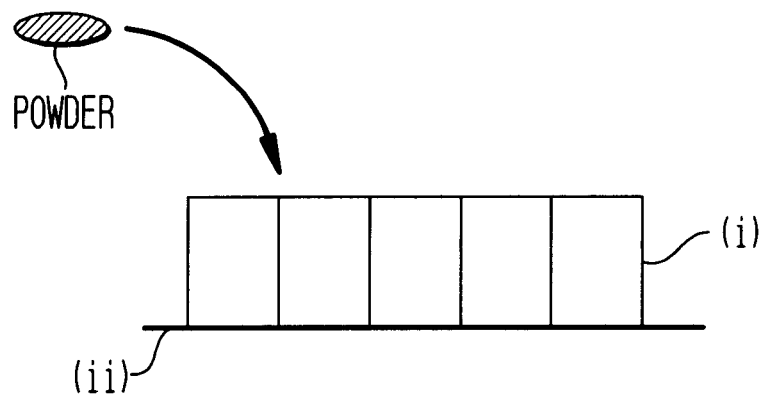
FIG. 1A shows a section of an unfilled honeycomb panel (i).

Clearly there are differences between the use of powders and that of syntactic pastes in their various forms and the foaming adhesive films. In the case of the syntactic pastes they must be placed in the structure to fully fill the spaces required by whatever physical technique is available. The foaming films must be cut and fitted into those spaces where they are to be used, but as explained will rarely fill the space completely.

In the case of the free flowing powders used in the process according to the present invention any simple pouring technique, manual pouring or by robotics or other method, may be used to deliver the powder into required spaces such as particular cells in a honeycomb panel. In order to be sure of filling the required spaces fully with a powder it is necessary that the space is fully filled with the uncured powder as far as its bulk density and particle size distribution will allow and that during the curing cycle the powder foams enough to form a coherent cured foam of the same volume. The powder may itself be capable of filling the space under no external pressure constraint or it may be capable of over filling the space but be constrained by external pressure applied to the skins during the cure cycle without any adverse effect.

To those familiar with the art it is not difficult to adjust the level of foaming, selection of particle size, and control of the rheology to give foams which perform satisfactorily as envisaged in this invention.

Once powder has been added to the bonded or unbonded skin and core a further skin may be added to provide an uncured sandwich panel. This unbonded panel may then be cured to provide a bonded panel wherein the bonding between the core material and the skin(s), as well as internal adhesion to the cell walls, is effected by the action of the cured powder. Thus, the process according to the present invention provides a method for the production of a cured, bonded sandwich panel wherein the adhesive bonding is provided by the cured powder. In addition the poured powder process according to the present invention may be utilised in a conventional system wherein the bonding between the skin(s) and the core material is effected by a curable liquid or film adhesive. In such cases the skin is coated with a liquid or film adhesive which (on curing) effects a bond between the skin and the core material and the pourable powder is used to fill the required spaces in the panel core. A further adhesive coated skin may be added to complete the sandwich which is then cured to form a cured bonded sandwich panel.

Thermally Expanding Powder

A thermally expanding powder, as defined herein, means a powder which, on the application of thermal (heat) energy, is transformed from a multitude of individual or otherwise distinct powder particles into a coherent cured foam (continuous or discontinuous) which is 'solid' at room temperature. A solid foam, produced from a thermally expanding powder, as defined herein, means an expanded material which comprises a substantially uniform distribution of voids and wherein the foam itself may be either rigid or flexible. For the avoidance of doubt, voids in the expanded powder may derive from the action of an expanding agent, the presence of air in the original unexpanded powder filled space or a mixture of both.

The thermally expanding powder of the present invention is preferably non sintering and pourable during application, more preferably the powder is non sintering across a range of temperatures and across storage conditions. It should be understood that a desirable range of temperatures for any given non sintering powder and application of such powder will be dependant upon the immediate temperature conditions under which the powder is both stored and applied. The powder is preferably non sintering during applications having temperatures in the range of from 0° C. to about 50° C., preferably from about 10° C. to about 40° C., more preferably from about 15° C. to about 30° C., especially from about 20° C. to about 25° C. and most preferably from about 22° C. to about 25° C.

During the process according to the present invention the applied powder, in the panel core, is heated in order to effect curing. It is essential that the powder, undergoes sufficient liquefaction during the heating process, to consolidate and to bond to itself and the surrounding surfaces within the panel core. It is to be understood that both powders which flow and those which do not flow when melted are useful herein. It is preferable that the powder melts during the process. It is highly preferable that the (melted) cured powder adheres to those surfaces which surround it except when it is used for making moulded objects.

Thermally expanding powders suitable for use herein may be prepared, for example, by grinding a solid thermally expanding resin composition. Suitable thermally expanding resins for use in the process of the present invention are thermosetting, resins containing at least expanding agents and are cured by heating.

Thermosetting, heat curable expanding powders suitable for use herein can be manufactured by the combination of solid resin in conjunction with an expanding agent and a curing agent, and then powdering this mixture. The selection of a solid resin having suitable non-sintering properties when combined with the expanding and curing agent can be achieved by routine experimentation. Solid resins suitable for use herein, include those as well known in the art such as epoxy resins, polyester resins, cyanate ester resins and polyimide resins.

Epoxy resins suitable for use herein include epoxy resins manufactured from 2,2-bis-(4hydroxyphenyl)propane and epichlorohydrin. Suitable epoxy resins include Araldite GT 6071 (RTM) supplied by Ciba Specialty Chemicals PLC.

It is important that the solid resin as herein described can be melted or is otherwise able to bond or fuse and has a sufficiently low viscosity to enable combination with additional materials such as hardeners (or curing agents), expanding agents, and other optional agents as required, without causing them to react. As, in general to make a non sintering powder at room temperature, a softening point of at least about 55° C. is required, this limits the lower temperature at which foaming and curing can take place because a suitable melt viscosity (to enable the combination with additional materials) will only be obtained at a relatively high temperature (versus the softening point temperature).

The process according to the present invention is illustrated by the following non-limiting examples.

EXAMPLE 1

Manufacture of a thermally foaming powder suitable for use in the process according to the present invention.

Formulation

Araldite GY260 (RTM) (Bisphenol A Epoxy resin from Ciba SC) 100 Parts by weight

Dicyandiamide 4.3 Parts by weight

Chlorotoluron 2.2 Parts by weight 3,3'-dimethyl 4,4'-diamino dicyclohexyl methane 10.6 Parts by weight Cyclohexylamine 6.0 Parts by weight Expancel 551 DU (RTM)( Unexpanded thermoplastic 3.0 Parts by weight micro-spheres from Akzo Nobel)

Cabosil TS720 (RTM)(Fumed silica from Cabot) 4.0 Parts by weight

All of the formulation materials were thoroughly mixed together at about 23° C. Mixing may be effected either manually or mechanically. The mixture was allowed to stand at 23° C. for about 17 hours followed by heating for about 2 hours at about 60° C. The sample was allowed to cool to 23° C. and powdered and sieved into different particle size fractions.

It should be understood that powder having, different particle sizes will lead to foams having differing densities on expansion. The selection of appropriate particle size to use for any particular application will involve consideration of the desired properties of the final expanded foam.

EXAMPLE 2

A sieved thermally foamable powder made according to Example 1, with a melting point of 60° C. and having a particle size between 500 μm and 1000 μm, was poured into the 6 mm inscribed circle diameter cells of an aluminium honeycomb panel which in turn was sitting on a sheet of aluminium. Sufficient foaming powder was added to fill each honeycomb cell completely, as judged by visual observation. The foaming powder was added to the honeycomb cells by manual pouring. Either mechanical or computer controlled dispensing means could equally be used to perform this operation. Another aluminium sheet was then placed on top of the filled honeycomb panel to form an un-bonded sandwich panel.

The uncured sandwich panel was placed in a hydraulic press and 300 kPa pressure was applied. The temperature of the press plates was raised from room temperature to 120° C. over a period of 30 minutes and the panel remained in the press at 120° C. for about 1 hour. The panel was then removed and allowed to cool back to room temperature.

The three components of the sandwich panel (the honeycomb and the two aluminium skins) were found to be adhered together. The panel was cut in cross section using a bandsaw. This revealed that each individual honeycomb cell that was originally filled with powder was now completely filled with a continuous, closed cell foam and this approach can be readily used to provide an edge filled and sealed panel without resorting to the traditional use of wet syntactic pastes. The foam was thermoset in nature and it adhered to all the honeycomb cell walls as well as to the aluminium sheets. The cut edge of the panel was very smooth and uniform. The expanded foam was found to have a density of 0.57 g/cm$^3$.

An illustration of the panel making stages as outlined in Example 2 is found in FIG. 1.

EXAMPLE 3

As example 2 but with a powder particle size between 1000–2000 µm The expanded foam was found to have a density of 0.55 g/cm$^3$.

EXAMPLE 4

As example 2 but with a powder particle size less than 500 µm. The expanded foam was found to have a density of 0.60 g/cm$^3$.

EXAMPLE 5

A thermally foaming powder manufactured by the use of a solid epoxy resin in conjunction with a suitable foaming (expanding) agent and a curing agent.

Formulation

Araldite GT 6071 (RTM) (Bisphenol A epoxy resin from Ciba Specialty Chemicals) 100 parts by weight
Dicyanamide 4.24 parts by weight
Expancel 091 DU 80 (RTM)( Unexpanded thermoplastic 5.0 parts by weight micro-spheres from Akzo Nobel)
The Araldite (RTM) was heated to 100° C. where it was in a liquid form. The dicyanmide and the Expancel (RTM) were incorporated into the resin and the blend was allowed to cool to about 23° C. The resulting solid was powdered and sieved into different particle size fractions.

Sieved powder having a particle size between 500 µm and 1000 µm was poured into the cells of an aluminium honeycomb panel (150 mm long×150 mm wide×12½ mm deep) which in turn was sitting on a sheet of aluminium. Sufficient foaming powder was added to fill each honeycomb cell completely, as judged by visual observation. Another aluminium sheet was then placed on top of the filled honeycomb panel to form a sandwich panel.

The uncured sandwich panel was placed in a hydraulic press and 300 kPa pressure was applied. The temperature of the press plates was raised from room temperature to 150° C. over a period of 30 minutes and the panel remained in the press at 150° C. for 3 hours. The panel was then removed and allowed to cool back to room temperature.

The three components of the sandwich panel were found to be adhered together. The panel was cut in cross section using a bandsaw. This revealed that each individual honeycomb cell that was originally filled with powder was now completely filled with a continuous, closed cell foam and this approach can be readily used to provide an edge filled and sealed panel without resorting to the traditional use of wet syntactic pastes. The foam was thermoset in nature and it adhered to all the honeycomb cell walls as well as to the aluminium sheets. The cut edge of the panel was very smooth and uniform. The expanded foam was found to have a density of 0.54 g/cm$^3$.

EXAMPLE 6

As example 5 but with a powder particle size range between 1000–2000 µm. The expanded foam was found to have a density of 0.52 g/cm$^3$.

EXAMPLE 7

As example 5 but with a powder particle size range of less than 500 µm. The expanded foam was found to have a density of 0.58 g/cm$^3$.

EXAMPLE 8

A sieved, thermally foamable powder made according to Example 1, with a melting point of 60° C. and having a particle size between 500 mm and 1000 mm, was poured into a metal mould which was coated with Araldite (RTM) Mould release agent QZ13 (available from Ciba Specialty Chemicals). The internal mould dimensions were 12.5 mm deep×12.5 mm wide×135 mm long. Sufficient foaming powder was added to fill the mould completely, as judged by visual observation. The foaming powder was added to the mould by manual pouring. Either mechanical or computer controlled dispensing means could equally be used to perform this operation. A metal sheet with sufficient area to cover the entire mould surface and coated with the mould release agent was placed on top of the powder filled mould and secured to completely seal the mould with sufficient external pressure applied to hold it in place during the cure cycle.

The sealed mould was placed in an oven at room temperature. The temperature of the oven was raised from room temperature to 120° C. over a period of 60 minutes and the mould remained in the oven at 120° C. for 1 hour. The mould was then removed and allowed to cool back to room temperature.

When the mould was disassembled a solid casting having the same dimensions as the mould was removed. The casting was a continuous closed cell foam which had a density of 0.6 g/cm$^3$ and a compressive strength of 31 MPa (ASTM 695)

DETAILED DESCRIPTION OF THE DRAWINGS

FIG. 1

FIG. 1 illustrates the key stages in the process according to the present invention.

FIG. 1A shows a section of an unfilled honeycomb panel (i) which is placed upon an aluminum sheet (ii).

Figure 1B:
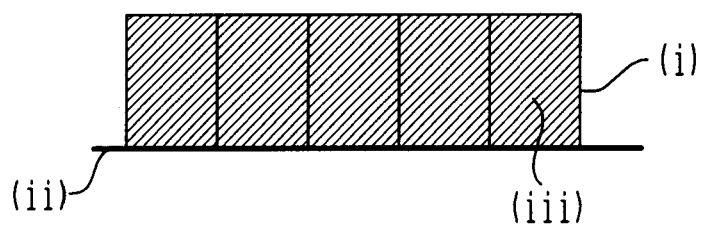
FIG. 1B shows a section of a honeycomb panel (i) which has been filled with powder (iii).

FIG. 1B shows a section of a honeycomb panel (i), upon an aluminum sheet (ii), which has been filled with powder (iii).

Figure 1C:
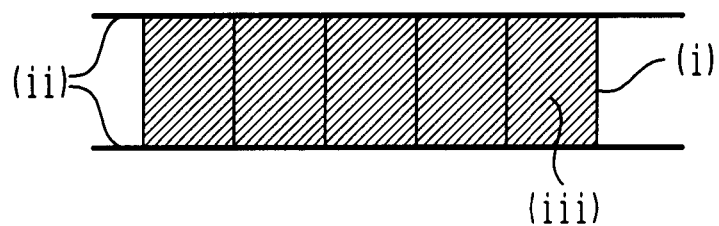
FIG. 1C shows a section of a honeycomb panel (i) which has been filled with powder (iii) and, which has aluminum sheets (ii) on either side. An aluminum sheet (ii) is present in FIGS. 1A, 1B and 1C.

FIG. 1C shows a section of a powder filled honeycomb panel (i) which has aluminum sheets (ii) on either side.

FIG. 2

Figure 2:
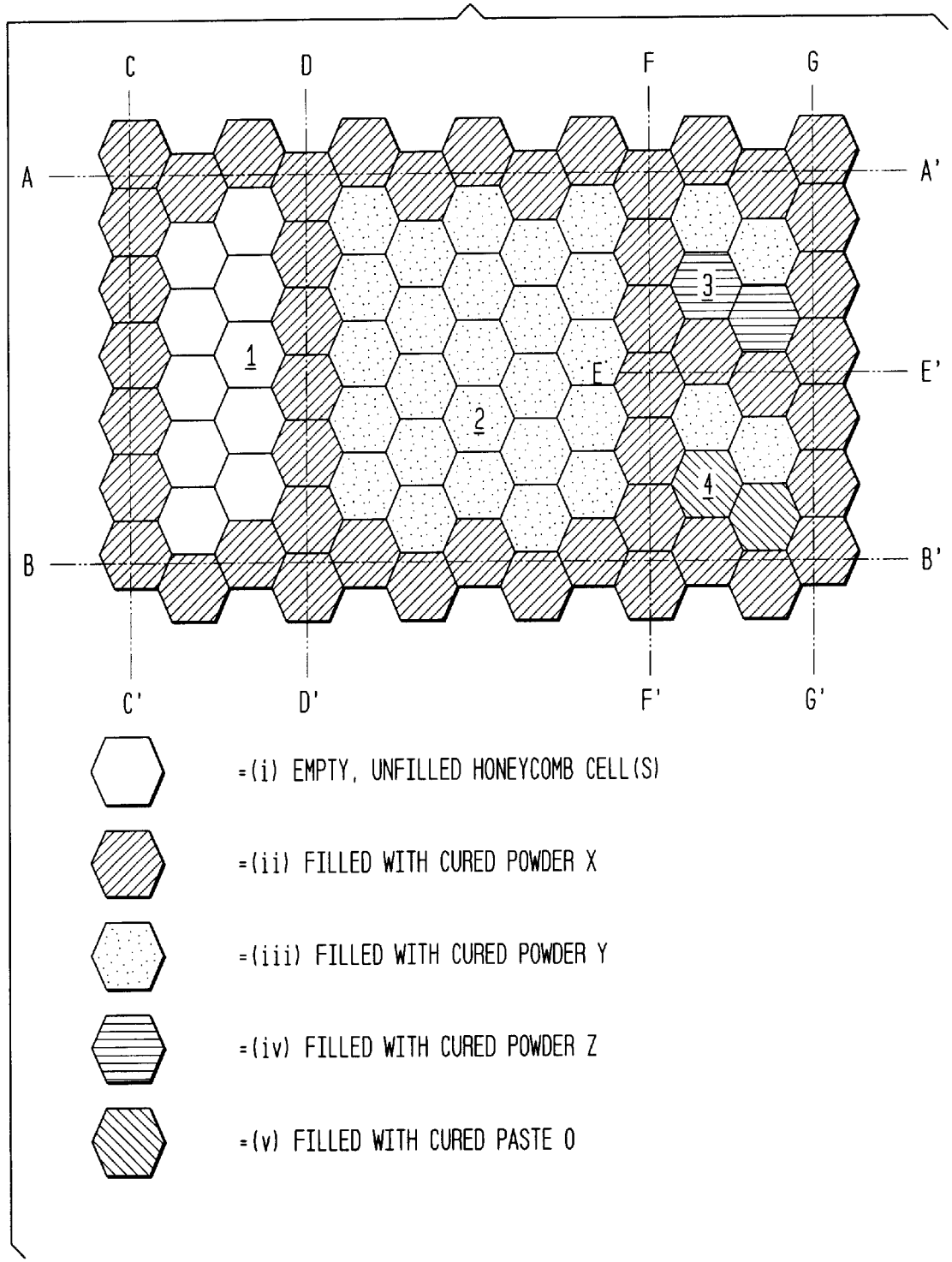
FIG. 2 illustrates an internal cross section of a filled cured sandwich panel according to the present invention. Line A to A'; B to B'; C to C'; D to D'; E to E'; F to F'; and G to G' represent the cutting lines necessary to produce four separate sandwich panels 1, 2, 3 and 4. Once cutting has been performed, four separate sandwich panels 1, 2, 3 and 4, are produced. These four panels represent different possibilities of an internal and edge-filled powder cured panel wherein the edge cells are filled with a cured powder and the internal cells are either unfilled (i) or filled with another cured powder or paste.

FIG. 2 illustrates an internal cross section of a filled cured sandwich panel according to the present invention.

Lines A to A'; B to B'; C to C'; D to D'; E to E'; F to F' and G to G' represent the cutting lines necessary to produce four separate sandwich panels 1, 2, 3 and 4.

(i) represents empty, unfilled honeycomb cell(s)

(ii) represents honeycomb cell(s) filled with cured powder X (iii) represents honeycomb cell(s) filled with cured powder Y (iv) represents honeycomb cell(s) filled with cured powder Z (v) represents honeycomb cell(s) filled with cured paste O.

Once cutting has been performed four separate sandwich panels, 1, 2, 3 and 4 will be produced. The composition of these panels is as follows:

Panel 1 is an edge-filled powder cured panel wherein the edge cells are filled with cured powder X and the internal cells are hollow.

Panel 2 is an internal and edge-filled powder cured panel wherein the edge cells are filled with cured powder X and the internal cells are filled with cured powder Y.

Panel 3 is an internal and edge-filled powder cured panel wherein the edge cells are filled with cured powder X and the internal cells are filled either with cured powder Y or cured powder Z.

Panel 4 is an internal and edge-filled powder cured panel wherein the edge cells are filled with cured powder X and the internal cells are filled either with cured powder Y or cured paste O.

What is claimed is:

1. A process for completely filling a void having an open face with a coherent low density solid comprising the steps of adding a free flowing thermally expanding, foamable and curing powder to the void to completely fill the void with the powder, and heating the powder causing the powder to expand, sinter and cure, wherein said free flowing thermally expanding, foamable and curing powder is an epoxy resin composition, and wherein the heating step provides a completely filled void.

2. A process according to claim 1 in which the void is a cavity in a mould.

3. A process according to claim 1 wherein the foamable powder is nonsintering in the temperature range of from 0° C. to about 50° C.

4. A process according to claim 1 wherein the foamable powder is prepared by grinding a solid thermally expandable resin, having a softening point of at least about 55° C., into a powder having a particle size of from between about 100 to 2000 μm.

5. A process according to claim 1 wherein the free flowing thermally expanding, foamable and curing powder is an epoxy resin manufactured from 2,2-bis-(4-hydroxyphenyl) propane and epichlorohydrin.

6. A process for the manufacture of a sandwich panel construction by filling, reinforcing and/or joining core materials of said construction comprising an internal core material, characterized in that at least some of the voids, these being either inside the core material having voids, or in between the same or different core materials, or the core materials and any other solid surfaces included in the sandwich panel construction, are filled according to the process of claim 1.

7. A process according to claim 6 further comprising, after the filling step and before the heating step, the step of pressing a facing material against the open face.

8. A process according to claim 7 wherein a film or liquid adhesive, is additionally present between the core material and the facing material.

9. A process according to claim 6 wherein the filled voids are fully filled with the foamable powder under no external applied pressure during the filling step.

10. A process according to claim 6 wherein the core material is selected from rigid foams, cellulose paper honeycomb, polyamide paper honeycomb, fabric based honeycomb, or metal honeycomb.

11. A process according to claim 7 wherein the facing material is either a preformed sheet of metal, glass, wood, plain or reinforced plastics, laminates and combinations thereof or a sheet formed in-situ from resin prepregs or fibres and further comprising the step of applying liquid curable resins to the facing material or combinations of facing materials.

12. A process according to claim 6 wherein the filled, sandwich panel is cured at a temperature range of from about 80° C. to about 200° C.

13. A sandwich panel obtained according to the process of claim 6.

* * * * *